United States Patent
Greven et al.

(10) Patent No.: US 10,399,636 B2
(45) Date of Patent: Sep. 3, 2019

(54) DRIVE DEVICE FOR AN ELECTRIC BICYCLE POWERED ELECTROMOTIVELY AND IN A HYBRID OPERATING STATE INVOLVING MUSCULAR POWER

(71) Applicant: AMPRIO GMBH, Neuss (DE)

(72) Inventors: Dietmar Greven, Dormagen (DE);
Thorsten Krill, Gemmingen (DE);
Alexander Baumann, Ostfildern (DE)

(73) Assignee: AMPRIO GMBH, Neuss (DE)

( * ) Notice: Subject to any disclaimer, the term of this patent is extended or adjusted under 35 U.S.C. 154(b) by 133 days.

(21) Appl. No.: 15/791,420

(22) Filed: Oct. 24, 2017

(65) Prior Publication Data
US 2018/0118304 A1    May 3, 2018

(30) Foreign Application Priority Data
Oct. 27, 2016   (DE) .................. 10 2016 120 544

(51) Int. Cl.
| | |
|---|---|
| *B62M 6/50* | (2010.01) |
| *B62M 6/75* | (2010.01) |
| *B62J 7/04* | (2006.01) |
| *H02K 7/108* | (2006.01) |
| *B62M 6/55* | (2010.01) |
| *B62M 3/00* | (2006.01) |

(52) U.S. Cl.
CPC .............. *B62M 6/50* (2013.01); *B62J 7/04* (2013.01); *B62M 3/003* (2013.01); *B62M 6/55* (2013.01); *B62M 6/75* (2013.01); *H02K 7/108* (2013.01); *B62K 2207/00* (2013.01)

(58) Field of Classification Search
CPC ......................................... B62M 6/50
USPC ................... 73/862.31, 862.338; 475/254
See application file for complete search history.

(56) References Cited

U.S. PATENT DOCUMENTS

| | | | | |
|---|---|---|---|---|
| 6,644,135 B1* | 11/2003 | Kishimoto | ............... | B62M 6/45 73/862.338 |
| 6,672,418 B1* | 1/2004 | Makino | .................... | B62M 6/45 180/206.3 |
| 8,091,674 B1* | 1/2012 | Zhang | ..................... | B62M 6/50 180/205.1 |

(Continued)

FOREIGN PATENT DOCUMENTS

| | | |
|---|---|---|
| DE | 10 2013 208 575 A1 | 11/2014 |
| DE | 20 2014 103 462 U1 | 10/2015 |

*Primary Examiner* — Tony H Winner
(74) *Attorney, Agent, or Firm* — Norman B. Thot

(57) ABSTRACT

A drive device for an electric bicycle includes a drive housing rigidly connected to a frame of the electric bicycle and a bottom bracket shaft arranged to rotate in the drive housing. First and second pedal cranks are arranged at respective ends of the bottom bracket shaft. The first and second pedal cranks are arranged to rotate with the bottom bracket shaft. A summing hollow shaft is rotatably supported in the drive housing. The summing hollow shaft is directly connected to the bottom bracket shaft via a cyclist's freewheel and, via a motor freewheel, to a gear driven by an electric motor. The summing hollow shaft is connected to a chain wheel for rotation therewith. A sensor assembly fixedly arranged in the drive housing includes a first torque sensor which cooperates with the bottom bracket shaft, and a second torque sensor which cooperates with the summing hollow shaft.

11 Claims, 1 Drawing Sheet

(56) References Cited

U.S. PATENT DOCUMENTS

| | | | |
|---|---|---|---|
| 2011/0183805 A1* | 7/2011 | Chan | B62M 6/50 475/254 |
| 2013/0086996 A1* | 4/2013 | Yao | B62M 6/50 73/862.31 |
| 2014/0150569 A1* | 6/2014 | Huang | B62M 6/50 73/862.333 |
| 2016/0185419 A1* | 6/2016 | Bendel | G01L 1/165 180/220 |
| 2018/0072376 A1* | 3/2018 | Kao | B62M 6/50 |
| 2018/0229799 A1* | 8/2018 | Lo | B62M 6/50 |
| 2018/0238754 A1* | 8/2018 | O'Connor | B62M 6/70 |

* cited by examiner

DRIVE DEVICE FOR AN ELECTRIC BICYCLE POWERED ELECTROMOTIVELY AND IN A HYBRID OPERATING STATE INVOLVING MUSCULAR POWER

CROSS REFERENCE TO PRIOR APPLICATIONS

Priority is claimed to German Patent Application No. DE 10 2016 120 544.3, filed Oct. 27, 2016. The entire disclosure of said application is incorporated by reference herein.

FIELD

The present invention relates to a drive device for an electric bicycle which is powered electromotively and in a hybrid operating state involving muscular power.

The present invention also relates to a method for operating a drive device for an electric bicycle which is powered electromotively and in a hybrid operating state involving muscular power.

BACKGROUND

Electric bicycles which are operated electromotively or in a hybrid operating state involving muscular power are referred to as "pedelecs" or "e-bikes". Pedelecs and e-bikes differ in that, in pedelecs, the drive device has a mere supporting function and is effective depending on the torque applied by the cyclist riding the bicycle, whereas in e-bikes, the drive device is effective independently of the torque applied by the cyclist. The pedaling movement of the cyclist in pedelecs is therefore absolutely necessary for the drive device to be active.

A typical pedelec drive device is described DE 20 2014 103 462 U2. That drive device has a drive housing in which a bottom bracket shaft is rotatably supported, wherein a first pedal crank is arranged at one end of the bottom bracket shaft and a second crank pedal is arranged at the opposite end of the bottom bracket shaft, both pedals cranks being secured against rotation relative to the shaft. The bottom bracket shaft is connected to a hollow shaft via a cyclist's freewheel, the hollow shaft being arranged in the drive housing and being connected to a chain ring in a manner secured against rotation relative thereto. The hollow shaft is further directly connected to a pulley via a motor freewheel, the pulley being driven by an electric motor. The sum of the cyclist's torque and the torque generated by the drive device is transmitted to the rear wheel of the bicycle via the chain ring and a chain and, for example, a pinion cassette.

The assistance provided by the drive device depends on the torque generated by the cyclist during the pedaling movement and on an assistance level. The different assistance levels are typically predefined by the manufacturers of such drive devices. The torque generated by the cyclist during the pedaling movement is detected by a torque sensor that usually cooperates with the bottom bracket shaft and, for example, determines the torsion of the bottom bracket shaft and, from that, determines the cyclist's torque.

Such a design is disadvantageous in that only the magnitude of the cyclist's torque is determined; whether the cyclist's torque induced in the bottom bracket shaft by the first pedal crank and/or the second pedal crank is unknown.

SUMMARY

An aspect of the present invention is to avoid the above-mentioned disadvantage.

In an embodiment, the present invention provides a drive device for an electric bicycle which is operated electromotively and by a muscular force. The drive device includes a drive housing rigidly connected to a frame of the electric bicycle and a bottom bracket shaft arranged to rotate in the drive housing. The bottom bracket shaft comprises a first end and a second end arranged opposite to the first end. A first pedal crank is arranged at the first end of the bottom bracket shaft and a second pedal crank is arranged at the second end of the bottom bracket shaft. Each of the first pedal crank and the second pedal crank are arranged for rotation with the bottom bracket shaft. A summing hollow shaft is rotatably supported in the drive housing. The summing hollow shaft is directly connected to the bottom bracket shaft via a cyclist's freewheel and, via a motor freewheel, to a gear which is driven by an electric motor. The summing hollow shaft is connected to a chain wheel for rotation therewith. A sensor assembly is fixedly arranged in the drive housing. The sensor assembly comprises a first torque sensor which is configured to cooperate with the bottom bracket shaft, and a second torque sensor which is configured to cooperate with the summing hollow shaft.

BRIEF DESCRIPTION OF THE DRAWING

The present invention is described in greater detail below on the basis of embodiments and of the drawing in which.

DETAILED DESCRIPTION

Figure 1:
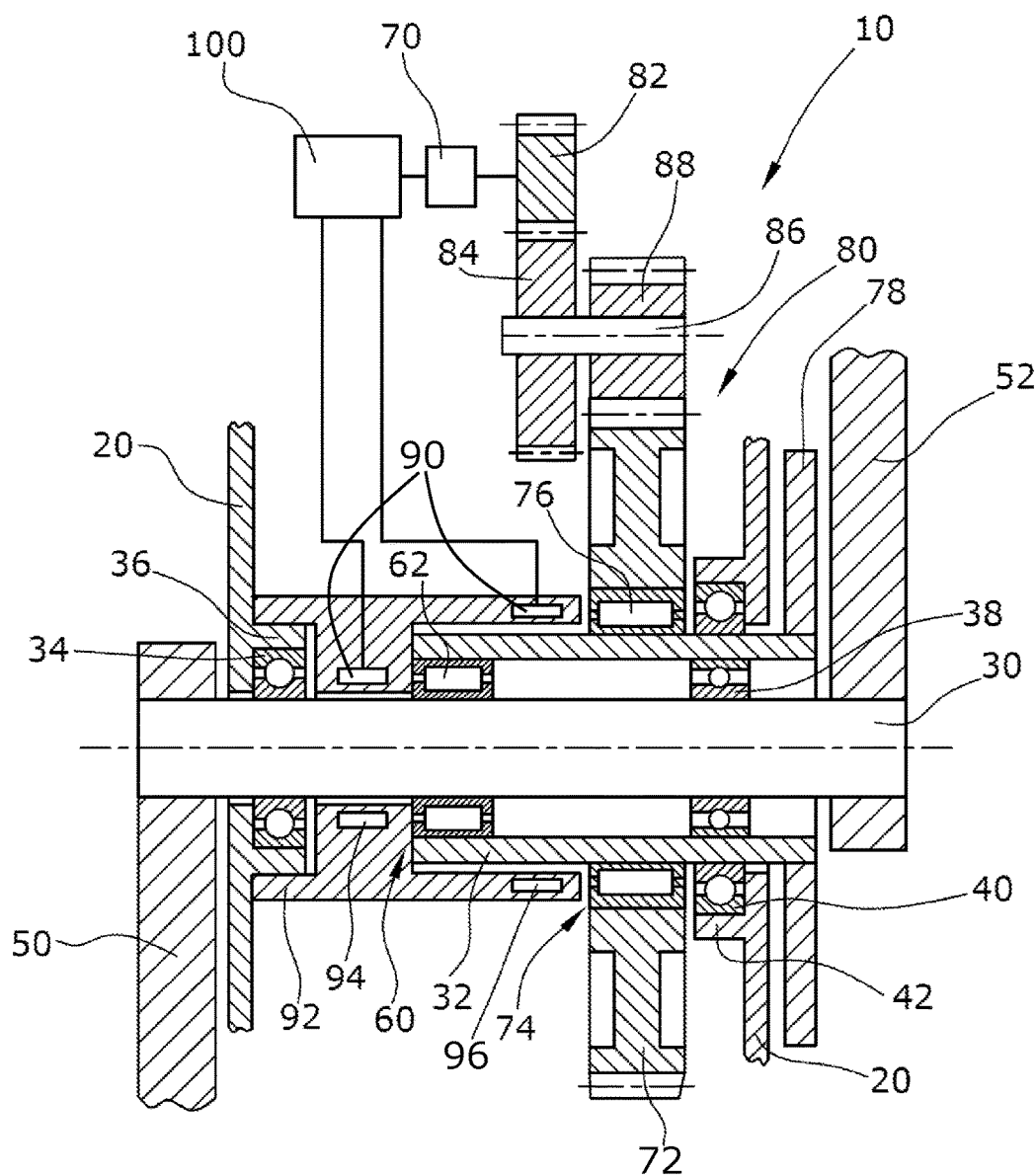
FIG. 1 shows a drive device of the present invention in a sectional view.

The drive device for an electric bicycle operated electromotively and by muscular force comprises a drive housing, wherein the drive housing is rigidly connected to a bicycle frame via an interface formed at the bicycle frame or is integrally formed with the bicycle frame.

A bottom bracket shaft is rotatably supported in the drive housing, typically by roller bearings. The bottom bracket shaft has a first pedal crank at a first longitudinal end and a second pedal crank at the opposite end, wherein the pedal cranks are offset from each other by 180°.

A cyclist's freewheel connects the bottom bracket shaft to a summing hollow shaft rotatably supported in the drive housing, wherein the summing hollow shaft is connected for rotation with a chain wheel. A chain engages the chain wheel. The chain connects the chain wheel to a sprocket arranged at the rear wheel for rotation therewith.

The cyclist's freewheel provides for a direction-independent torque transmission from the bottom bracket shaft to the summing hollow shaft so that the cyclist can also interrupt the pedaling while traveling or may even backpedal with the pedal cranks.

The summing hollow shaft is further directly connected to a gear via a motor freewheel, the gear being driven by an electric motor. The transmission of torque between the gear and the summing hollow shaft is also performed in only one sense of rotation. The connection of the gear to the summing hollow shaft via the motor freewheel, which connection depends on the sense of rotation, allows the gear to be decoupled from the summing hollow shaft if the rotational speed of the summing hollow shaft is higher than the rotational speed of the gear. This is true, for example, if the electric motor is deactivated. The electric motor may be deactivated manually by the cyclist or by the motor control if, for example, the speed of the pedelec exceeds the allowable assistance speed, which is generally around 25 km/h.

The cyclist's torque is measured by a sensor arrangement comprising a first torque sensor and a second torque sensor. The torque sensors are arranged rigidly in the drive housing, wherein the first torque sensor cooperates with the bottom bracket shaft and the second torque sensor cooperates with the summing hollow shaft. The first torque sensor measures the torsion of the pedal crank and the second torque sensor measures the torsion of the summing hollow shaft, wherein the measured values of the torque sensors are compared to each other, and it is concluded therefrom whether the cyclist's torque is induced in the drive device by the first pedal crank and/or by the second pedal crank.

The cyclist's torque induced by the first pedal crank and the cyclist's torque induced by the second pedal crank are thereby determined, whereby the accuracy of the torque measurement is increased and the control of the electric motor is improved. It is thereby possible to detect certain riding states of the cyclist, for example, whether the cyclist is riding out-of-saddle, and the electric motor can correspondingly be controlled. It is thus possible to avoid a failed control or a control build-up. The quality of the control can thereby be drastically improved.

In an embodiment of the present invention, the first torque sensor can, for example, be cinematically arranged between the first pedal crank and the cyclist's freewheel. With such an arrangement, the first torque sensor exclusively measures the cyclist's torque induced in the bottom bracket shaft by the first pedal crank, wherein a torsion of the bottom bracket shaft mainly occurs between the first pedal crank and the cyclist's freewheel if the cyclist's torque is induced via the first pedal crank.

In an embodiment of the present invention, the second torque sensor can, for example, be cinematically arranged between the cyclist's freewheel and the chain wheel, whereby the cyclist's torque that is induced in the bottom bracket shaft by the second pedal crank is determined. This torque is transmitted to the summing hollow shaft via the cyclist's freewheel. At the opposite end of the summing hollow shaft, the counter force acts on the chain wheel so that the summing hollow shaft is twisted. The cyclist's torque transmitted by the second pedal crank is determined, for example, by subtraction, by comparing the measured values of the first torque sensor and the second torque sensor.

In an embodiment of the present invention, the motor freewheel can, for example, be arranged cinematically between the second torque sensor and the chain wheel, whereby the torsion which is caused by the torque coming from the electric motor and which is transmitted to the summing hollow shaft via the gear is not detected by the torque sensors, and the torque measurements performed by the torque sensors are not thereby corrupted. Pedal crank-selective torque measurements by the torque sensors are thereby facilitated.

In an embodiment of the present invention, at least one of the torque sensors can, for example, be a magnetic field sensor, wherein the bottom bracket shaft and/or the summing hollow shaft each have a corresponding magnetized region. The bottom bracket shaft and/or the summing hollow shaft is/are magnetized in the circumferential direction, wherein the magnetic field is positioned circularly in the body of the bottom bracket shaft and/or the summing hollow shaft and, in absence of torsion, does not or only slightly deviates beyond the surface of the bottom bracket shaft and/or the summing hollow shaft. In case of torsion resulting from a drive load on the pedal crank and/or the summing hollow shaft in the circumferential direction, a magnetic field outside the bottom bracket shaft and/or the summing hollow shaft is obtained whose magnitude depends on the amount of torsion. The magnetic field sensor measures this magnetic field outside the bottom bracket shaft and/or outside the summing hollow shaft from which the cyclist's torque is induced in the bottom bracket shaft by the pedal cranks.

In an embodiment of the present invention, both torque sensors can, for example, be fixedly arranged at a single sensor receiving sleeve which is fixedly arranged in the drive housing. The assembly of the torque sensors in the drive housing is facilitated thereby. The sensor receiving sleeve can, for example, surround the bottom bracket shaft and the summing hollow shaft on the outside.

In an embodiment of the present invention, at least one of the freewheels can, for example, be a sprag freewheel. A sprag freewheel allows for the transmission of higher torques compared to freewheels with spring-loaded pawls or spring-loaded clamping rollers. A sprag freewheel can also easily be combined with a roller bearing.

In an embodiment of the present invention, the gear driven by the electric motor can, for example, be designed as the output of a two-stage transmission. The electric motor typically has a high rotational speed compared to the bottom bracket shaft or to the summing hollow shaft. For the summation of the cyclist's torque and the motor torque at the summing hollow shaft, the rotational speed of the electric motor must be reduced to the rotational speed provided by the cyclist. This is effected by a two-stage transmission, wherein the gear forms the output of the two-stage transmission.

In an embodiment of the present invention, the first torque sensor, the second torque sensor, and the electric motor can, for example, be connected to a control device, wherein the signals of the torque sensors are evaluated in the control device and the electric motor is controlled based on the evaluated signals. The assistance level set is here taken into consideration.

The present invention also provides a method for operating a drive device for an electric bicycle. A torsional moment in the bottom bracket shaft is here determined by the first torque sensor and a torsional moment in the summing hollow shaft is determined by the second torque sensor, the determined torsional moments are compared to each other and, finally, a parameter is generated therefrom for controlling the electric motor. Using this method, the cyclist's torque is determined in a simple manner as a function of the individual pedal cranks, and the electric motor is controlled based thereon. The accuracy of the measurement of the cyclist's torque is increased and the control of the electric motor is improved by measuring the cyclist's torque as a function of the individual pedal cranks.

FIG. 1 shows a drive device 10 with a drive housing 20 which, via an interface (not illustrated in FIG. 1), is rigidly arranged at a pedelec bicycle frame (also not illustrated in FIG. 1). A bottom bracket shaft 30 and a summing hollow shaft 32 are arranged in the drive housing 20, wherein a first pedal crank 50 is fixedly arranged at a first longitudinal end of the bottom bracket shaft 30 and a second pedal crank 52 is arranged at the opposite end of the bottom bracket shaft 32.

The bottom bracket shaft 30 is directly or indirectly supported for rotation in the drive housing 20 via a first roller bearing 34 and a second roller bearing 38. The first roller bearing 34 is arranged between an annular protrusion 36, formed on the drive housing 20, and the bottom bracket shaft 30. The second roller bearing 38 is arranged between an inner circumferential surface of the summing hollow shaft 32 and the bottom bracket shaft 30. The summing hollow shaft 32 is rotatably supported at a protrusion 42 formed on the drive housing 20 via a third roller bearing 40.

The bottom bracket shaft 30 and the summing hollow shaft 32 are cinematically connected via a cyclist's freewheel 60, wherein the cyclist's freewheel 60 only transmits torques in one sense of rotation of the bottom bracket shaft 30 to the summing hollow shaft 32. The cyclist's freewheel 60 is a sprag freewheel. Upon a rotational movement of the bottom bracket shaft 30 in the sense of rotation in which a torque is transmitted, the clamping bodies 62 become clamped between the bottom bracket shaft 30 and the summing hollow shaft 32 and thus form a friction-type connection between the bottom bracket shaft 30 and the summing hollow shaft 32. Upon a rotational movement of the bottom bracket shaft 30 in the opposite sense of rotation, the clamping bodies 62 do not become clamped between the bottom bracket shaft 30 and the summing hollow shaft 32, so that no torque transmission occurs between the bottom bracket shaft 30 and the summing hollow shaft 32.

The summing hollow shaft 32 is additionally provided with a gear 72 driven by an electric motor 70. The connection between the summing hollow shaft 32 and the gear 72 is effected via a motor freewheel 74 which also is designed as a sprag freewheel with clamping bodies 76. The gear 72 is the output of a two-stage transmission 80, wherein the two-stage transmission 80 is composed of the gear 72, a shaft 86 on which a gear 88 meshing with the gear 72 and a gear 84 are arranged for rotation therewith, and a motor pinion 82 meshing with the gear 84, wherein the motor pinion 82 is driven by the electric motor 70 rigidly arranged in the drive housing 20. The two-stage transmission 80 has a gear reduction that adapts the high motor speed of the electric motor 70 to the rotational speed provided by the driver, which is typically 60 to 120 revolutions per minute.

In operation, the cyclist's torque and the motor torque are transmitted to the summing hollow shaft 32, wherein the resulting summed torque is transmitted to the chain wheel 78 connected to the summing hollow shaft 32 for rotation therewith. A chain (not illustrated in FIG. 1) connects the chain wheel 78, for example, to a pinion cassette connected to the rear wheel of the pedelec.

In a pedelec, the drive assistance provided by the electric motor 70 depends on the cyclist's torque generated by the cyclist for driving the pedelec. For a measurement of the cyclist's torque, a sensor receiving sleeve 92 with a sensor assembly 90 is fixedly arranged in the drive housing 20. The sensor assembly 90 has a first torque sensor 94 and a second torque sensor 96. The first torque sensor 94 cooperates with the bottom bracket shaft 30, wherein the first torque sensor 94 is a magnetic field sensor and the bottom bracket shaft 30 is magnetized in the region of the first torque sensor 94. The second torque sensor 96 cooperates with the summing hollow shaft 32, wherein the second torque sensor 96 is a magnetic field sensor and the summing hollow shaft 32 is magnetized in the region of the second torque sensor 96.

In a not loaded state, the magnetic fields of the bottom bracket shaft 30 and the summing hollow shaft 32 substantially only comprise a magnetic field inside the bottom bracket shaft 30 and the summing hollow shaft 32, respectively, wherein, without torsion of the bottom bracket shaft 30 or the summing hollow shaft 32, the magnetic field does not or only slightly protrudes beyond the surface of the bottom bracket shaft 30 or the summing hollow shaft 32. Upon torsion of the bottom bracket shaft 30 or the summing hollow shaft 32, magnetic fields outside the bottom bracket shaft 30 or the summing hollow shaft 32 are obtained, whose respective magnitude depends on the amount of torsion. The magnetic field sensors 94, 96 measure the magnetic fields generated outside the bottom bracket shaft 30 or the summing hollow shaft 32 upon torsion of the bottom bracket shaft 30 or the summing hollow shaft 32, from which measurement the torque applied at the bottom bracket shaft 30 or the summing hollow shaft 32 is determined.

The first torque sensor 94 is cinematically and spatially arranged between the first pedal crank 50 and the cyclist's freewheel 60. The second torque sensor 96 is cinematically and spatially arranged between the chain wheel 78 and the cyclist's freewheel 60. By such an arrangement of the first torque sensor 94 and the second torque sensor 96, the cyclist's torque induced in the drive device 10 by the cyclist can be measured in dependence on the first pedal crank 50 and the second pedal crank 52 via which the cyclist's torque is induced. The second torque sensor 96 here measures all of the cyclist's torque regardless of the first pedal crank 50 and second pedal crank 52 by which the cyclist's torque is induced. The first torque sensor 94 exclusively measures a cyclist's torque induced via the first pedal crank 50.

A comparison of the signals from the first torque sensor 94 and the second torque sensor 96 determines via which of the first pedal crank 50 and the second pedal crank 52 the cyclist's torque is induced in the drive device 10, wherein the first torque sensor 94 and the second torque sensor 96 are connected to a control unit 100, and the comparison is made by the control unit 100. The control unit 100 is also connected to the electric motor 70. The control unit 100 evaluates the signals from the first torque sensor 94 and the second torque sensor 96, determines the level of assistance by the electric motor 70 based on the evaluation of the signals from the first torque sensor 94 and the second torque sensor 96, and controls the electric motor 70 accordingly.

It should be clear that other structural embodiments of the drive system are also possible with regard to the embodiment described. Reference should also be had to the appended claims.

What is claimed is:
1. A drive device for an electric bicycle operated electromotively and by a muscular force, the drive device comprising:
   a drive housing rigidly connected to a frame of the electric bicycle;
   a bottom bracket shaft arranged to rotate in the drive housing, the bottom bracket shaft comprising a first end and a second end arranged opposite to the first end;
   a first pedal crank arranged at the first end of the bottom bracket shaft and a second pedal crank arranged at the second end of the bottom bracket shaft, each of the first pedal crank and the second pedal crank being arranged for rotation with the bottom bracket shaft;
   a cyclist's freewheel;
   a motor freewheel;
   a gear;
   an electric motor configured to drive the gear;
   a chain wheel;
   a summing hollow shaft rotatably supported in the drive housing, the summing hollow shaft being directly connected to the bottom bracket shaft via the cyclist's freewheel and, via the motor freewheel, to the gear which is driven by the electric motor, and the summing hollow shaft being connected to the chain wheel for rotation therewith; and a sensor assembly fixedly arranged in the drive housing, the sensor assembly comprising a first torque sensor which is configured to cooperate with the bottom bracket shaft, and a second torque sensor which is configured to cooperate with the summing hollow shaft.

2. The drive device as recited in claim 1, wherein the first torque sensor is arranged between the first pedal crank and the cyclist's freewheel.

3. The drive device as recited in claim 1, wherein the second torque sensor is arranged between the cyclist's freewheel and the chain wheel.

4. The drive device as recited in claim 1, wherein the motor freewheel is arranged between the second torque sensor and the chain wheel.

5. The drive device as recited in claim 1, wherein,
at least one of the first torque sensor and the second torque sensor is a magnetic field sensor, and
at least one of the bottom bracket shaft and the summing hollow shaft has a corresponding magnetized region.

6. The drive device as recited in claim 1, further comprising:
a single sensor receiving sleeve fixedly arranged in the drive housing,
wherein,
both the first torque sensor and the second torque sensor are fixedly arranged at the single sensor receiving sleeve.

7. The drive device as recited in claim 6, wherein the single sensor receiving sleeve is configured to surround the bottom bracket shaft and the summing hollow shaft on an outside.

8. The drive device as recited in claim 1, wherein at least one of the cyclist's freewheel and the motor freewheel is a sprag freewheel.

9. The drive device as recited in claim 1, further comprising:
a two-stage transmission,
wherein,
the gear driven by the electric motor is provided as an output of the two-stage transmission.

10. The drive device as recited in claim 1, further comprising:
a control device,
wherein,
the first torque sensor, the second torque sensor, and the electric motor are connected to the control device.

11. A method for operating the drive device as recited in claim 10, the method comprising:
determining a first torsional moment in the bottom bracket shaft by the first torque sensor;
determining a second torsional moment in the summing hollow shaft by the second torque sensor;
comparing the first torsional moment and the second torsional moment to each other in the control device; and
generating a parameter from the comparison of the first torsional moment and the second torsional moment; and
using the parameter to control the electric motor.

* * * * *